No. 731,068. PATENTED JUNE 16, 1903.
G. L. PHELPS.
SELF ALINING CUTTER BAR SECTION.
APPLICATION FILED SEPT. 24, 1902.
NO MODEL.
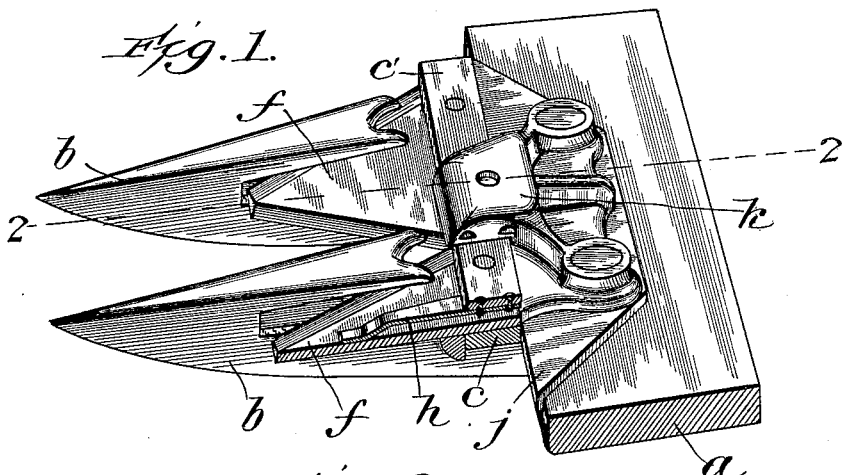
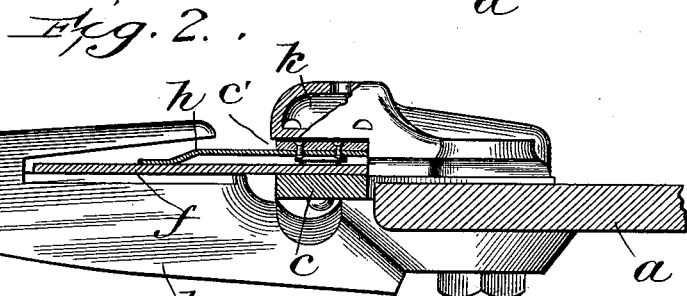
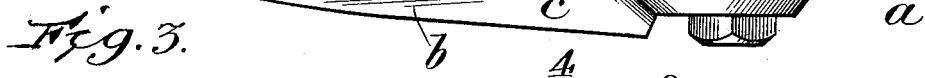
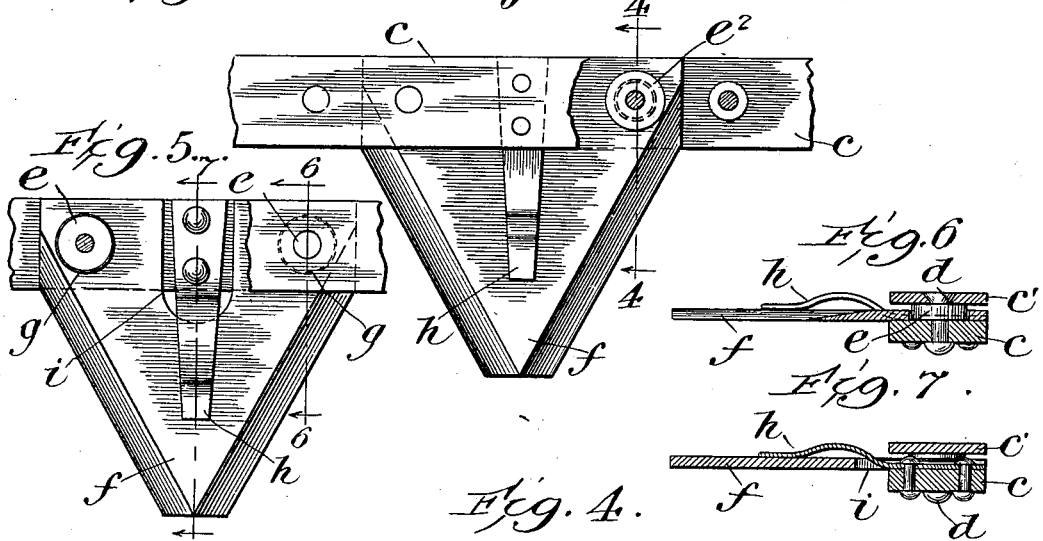
Witnesses:
D. W. Edelin.
J. E. Hutchinson Jr.
Inventor:
G. L. Phelps,
By his attys.
Pennie & Goldsborough
THE NORRIS PETERS CO., PHOTO-LITHO., WASHINGTON, D. C.

No. 731,068. Patented June 16, 1903.

UNITED STATES PATENT OFFICE.

GEORGE L. PHELPS, OF CHICAGO, ILLINOIS.

SELF-ALINING CUTTER-BAR SECTION.

SPECIFICATION forming part of Letters Patent No. 731,068, dated June 16, 1903.

Application filed September 24, 1902. Serial No. 124,633. (No model.)

*To all whom it may concern:*

Be it known that I, GEORGE L. PHELPS, a resident of West Pullman, city of Chicago, county of Cook, State of Illinois, have invented certain new and useful Improvements in Self-Alining Cutter-Bar Sections; and I do hereby declare the following to be a full, clear, and exact description of the invention, such as will enable others skilled in the art to which it appertains to make and use the same.

The invention relates to the means employed for keeping the cutters or sickle-sections down in working contact with the guards. Many contrivances have already been devised for this purpose. All, however, contemplate that the cutter-sections shall be rigidly connected to their bar, and those which operate to hold the sections elastically down require the employment of spring-fingers that are secured to the finger-bar.

The present invention is a departure from all the prior arrangements with which I am acquainted and contemplates the attachment of the cutters or sickle-sections to their bar in a way to yield slightly transversely of the bar and the employment of springs which react between the cutter-bar and the sections instead of between the finger-bar and the sections through the intermediacy of clips or other contrivances.

The particular object of this arrangement is to hold each cutter-section down independently of the others and so as to preserve its alinement with its guard without regard to the position of the adjacent sections.

With this object more especially in view I provide rigid clips for holding the cutter-bar down and connect the cutter-sections to their bar loosely, so that they have slight play vertically, and I interpose between the cutter-bar and these loosely-connected sections individual springs for each section. The connection between the cutter-bar and its sections is analogous to a hinge in that it is rigid in the direction of the horizontal plane of the cut, but has a certain amount of yield or play in a vertical direction toward or from the underlying guards. The springs are secured at their rear ends to the cutter-bar, and their forward ends bear on the cutters at about the middle of their cutting portion. The sections are thus held down elastically without the employment of spring-fingers secured to the finger-bar, as in certain recently-patented inventions.

The invention is illustrated in the accompanying drawings, wherein—

Figure 1 shows in perspective a portion of a complete cutting apparatus. Fig. 2 is a cross-section of the same on the line 2 2, Fig. 1. Fig. 3 is a detailed plan showing the manner of connecting the cutting-sections and springs to the cutter-bars. Fig. 4 is a cross-section of Fig. 3 on the line 4 4. Fig. 5 is a view similar to Fig. 3, but showing a modified construction. Fig. 6 is a cross-section of Fig. 5 on the line 6 6, and Fig. 7 is a cross-section of Fig. 5 on the line 7 7.

Referring to these views, $a$ denotes a finger-bar, and $b$ the guard-fingers thereof, which are secured to the bar by bolts and nuts in the usual way.

The cutter-bar is composed of two parts—namely, a main bar $c$ and a lighter auxiliary bar $c'$. The auxiliary bar is connected to the main bar by rivets $d$ and extends longitudinally along the main bar and slightly above it. Interposed between these two parts of the cutter-bar are washers $e$, which encircle the rivets $d$ and act as spacing-blocks to hold the main and auxiliary bars of the cutter-bar the required distance apart.

The cutters or sickle-sections $f$ are of the ordinary construction except in so far as their manner of connection to the cutter-bar is concerned. Instead of being rigidly riveted to this bar, as usual, they are connected in the manner best illustrated in Figs. 5 and 6, where it will be seen that the sections are provided with perforations $g$, which fit over the spacing-washers $e$, thereby inclosing the rear edges of the cutter-sections between the main and auxiliary bars of the cutter-bar.

The cutter-sections are preferably secured to their bar at the two points corresponding to the usual rivets in the old constructions; but instead of being rigidly secured to the bar the perforations $g$ are slightly larger than the washers $e$ and permit the sections to have a slight movement transversely of the bar and in a vertical plane when in operation independently of the bar itself. The connection between the cutters and their bar in the horizontal plane of the cut should be as rigid as possible; but the loose connection between the parts just described is for the purpose of allowing the cutter-sections to be held down upon the ledger-plates of the guard-fingers by springs, which act upon the sections only without exerting any stress upon the cutter-bar and leaving this bar free to be held down to its seat rigidly.

As shown in all the sectional figures, the spacing-washers $e$ are slightly thicker than the cutter-sections, so as to space the members of the cutter-bar sufficiently far apart to permit of the slight vertical movement of the sections above referred to. In the construction shown in Figs. 3 and 4 there are two washers $e'$ $e^2$ at each of the rivets, and the upper washer $e^2$ is considerably larger than the lower one $e'$ and overlaps the edge of the perforation in the cutter-sections, by means of which it is connected to the cutter-bar. In this arrangement the spring $h$, which holds the cutter-sections down on its guard, is riveted at its rear end to the under side of the auxiliary member of the cutter-bar midway, as shown in Fig. 3, between the enlarged upper washers $e^2$.

In the construction shown in Figs. 5, 6, and 7 the upper washers $e^2$ of the modification just described are dispensed with and single washers $e$ are employed. In this construction the spring is riveted to the principal member $c$ of the cutter-bar, as best shown in Fig. 7, and the sections themselves are provided with a longitudinal cut or slot $i$ in the center of their length to permit the springs to be riveted to the lower member of the cutter-bar and at the same time to allow the two members of the bar to be connected together as closely as possible.

In both constructions the cutter-bar (composed of parts $c$ $c'$) slides in the usual raceway on the shanks of the guard-fingers with its rear edge in contact with the overhanging lip of a chafe or wear plate which is secured at intervals along the finger-bar, and the cutter-bar is held down to its seat on this raceway by means of rigid unyielding clips $k$, that are securely bolted to the finger-bar in the usual manner.

As already described, it is intended that the auxiliary bar $c'$ of the cutter-bar should be practically coextensive in length with the main bar $c$. If desired, however, this auxiliary bar may be made in short sections, just long enough to engage the sickle-clips $k$ throughout the length of the stroke of the cutter-bar. In this instance the cutter-sections, which are secured to the bar between the lengths of the overlying auxiliary bar, will be held down to the main bar by overhanging heads above the washers similar to the enlarged washers $e^2$ in the modification illustrated in Fig. 4.

The construction being as above described, and it being understood that each of the cutter-sections is to be provided with a spring-finger $h$, it is to be noted that in the first place the cutter-bar is held down rigidly to its seat, as it ought to be, and, secondly, that the cutter-sections are held down upon the guards by means that are entirely independent of the clips for holding the cutter-bar, and, in the third place, that the springs which hold these sections down are not secured to the finger-bar, but react between the cutter-bar and the cutter-sections.

The invention is believed to present the first instance of any connection between the cutter-sections and the cutter-bar which will permit the sections to be held in working contact with the guards by means reacting between the cutter-bar and the cutter-sections in contradistinction to means reacting between the finger-bar and the sections. I do not, therefore, desire or intend to be limited to the particular construction shown and described, as the invention, particularly in so far as the construction of the cutter-bar and its connection with the cutter-sections is concerned, admits of considerable variation from the arrangement herein shown and described without departing from its spirit or scope.

Having thus described my invention, what I claim, and desire to secure, is—

1. In a cutting apparatus for mowers, reapers, and the like, the combination with the guards, the finger-bar and the cutter-bar, of rigid clips secured to the finger-bar and holding the cutter-bar down, cutter-sections secured loosely to the cutter-bar, and springs reacting between the cutter-bar and the sections to hold the latter down on the guards.

2. In a cutting apparatus for mowers, reapers, and the like, the combination with the guards, and finger-bar, of a composite cutter-bar composed of a main bar and an auxiliary bar overlying and rigidly secured to the main bar, rigid clips secured to the finger-bar and holding the cutter-bar down, cutter-sections loosely secured to the main bar of the cutter-bar, and springs secured at their rear ends to the cutter-bar and having their front ends bearing on the cutter-sections, so as to hold them down on the guards.

3. In a cutting apparatus for mowers, reapers, and the like, the combination of a composite cutter-bar composed of a main bar $c$, and an auxiliary overlying bar $c'$, secured to the main bar, with intervening washers $e$ between, cutter-sections secured between the main and auxiliary bars by means of the washers passing loosely through enlarged perforations $g$ in the sections, and springs $h$ secured at their rear ends to either of the bars of the cutter-bar and having their opposite ends bearing down on the front part of the cutters.

In testimony whereof I affix my signature in presence of two witnesses.

GEORGE L. PHELPS.

Witnesses:
 OLIVER E. HOFLUND,
 CHAS. W. ALLEN.